Patented Mar. 6, 1928.

1,661,859

UNITED STATES PATENT OFFICE.

GEORGE P. SUPPES, OF JOHNSTOWN, PENNSYLVANIA.

METHOD OF MAKING FURNACE LINING.

No Drawing.    Application filed March 15, 1926.    Serial No. 94,988.

The present invention relates broadly to the art of lining furnaces or similar structures adapted to resist comparatively high temperatures, and more particularly to linings suitable for use in open hearth furnaces either below or above the level of the bath, other metallurgical furnaces, and for furnaces and firing arches of furnaces of general utility.

At the present time it is customary in the art to which the present invention relates to manufacture fire bricks and silica bricks suitable for the general purpose herein referred to by molding a composition of silica sand, and lime, drying the same and then burning the bricks in kilns for a considerable period of time at a comparatively high temperature. The silica bricks as produced in this manner usually contain not in excess of three percent of lime, due to mechanical difficulties in effectively using a higher percentage for the firing process. Bricks produced in this manner are also expensive to manufacture because of the cost of burning them in kilns.

The present invention has for its object to provide a method of forming silica bricks or blocks for use in furnaces and the like which may be manufactured more economically than the bricks heretofore used for this purpose, and without the usual burning operation.

In accordance with the present invention, it is proposed to form bricks or blocks which may have the same composition as the bricks or blocks heretofore used, that is, containing silica sand, and lime, but the percentage of lime may be varied to suit the requirements of the brick, and as high as eight percent or even more of lime may be used. The bricks or blocks are formed from this composition by molding or pressing after which they are baked for a relatively brief period of time by live steam under pressure. During this baking operation in the presence of steam the composition sets, the bond matures, and the brick becomes hard and can be thereafter handled in the usual way.

This steam baked brick is then ready for installation directly in the furnace. It is built into the furnace in the usual way that blocks heretofore used for this purpose are built into the furnace.

One advantage of the present invention is the provision of an improved method of lining furnaces, constructing fire arches and the like from steam baked bricks instead of from the burned bricks heretofore used, and it will be hereinafter understood that the term bricks is used generically as a definitive of blocks, tiles and other forms.

Another advantage of the present invention arises out of the economy which results in using a brick that can be moulded and finished in a few hours with relatively little fuel, as distinguished from the expensive burned bricks heretofore used where several days are required for the burning of the bricks.

It has been found by actual tests that the life of a brick is very materially lengthened by the elimination of the usual step of burning and the substitution of the baking process by live steam under pressure, and that this treatment under pressure accomplishes for metallurgical uses what the burning in kilns at temperatures between 1800° to 2800° F. formerly did.

While I have specifically defined the invention as being adapted for use in connection with silica bricks, it will be understood that the invention is not limited to the specific materials used in the composition of the brick or the use of any specific quantity of any of the materials, and that the silica sand used for the blocks can be of any suitable grade or coarseness.

I claim:

1. The method of forming a furnace lining which consists in moulding a refractory composition into blocks, hardening the blocks by baking them in the presence of steam under pressure until the bond has matured, and then laying the blocks in the furnace to form a lining.

2. The method of forming a furnace lining which consists in moulding a refractory composition of silica sand and lime into blocks, hardening the blocks by baking them in the presence of steam under pressure until the bond has matured, and then laying the blocks in the furnace to form a lining.

In testimony whereof I have hereunto set my hand.

GEORGE P. SUPPES.